United States Patent [19]

Becker et al.

[11] 4,339,592

[45] Jul. 13, 1982

[54] PROCESS FOR THE PRODUCTION OF URETHANES

[75] Inventors: Robert Becker, Leverkusen; Christian Rasp; Günter Stammann, both of Cologne; Johann Grolig, Leverkusen, all of Fed. Rep. of Germany

[73] Assignee: Bayer Aktiengesellschaft, Leverkusen, Fed. Rep. of Germany

[21] Appl. No.: 238,518

[22] Filed: Feb. 26, 1981

[30] Foreign Application Priority Data

Mar. 12, 1980 [DE] Fed. Rep. of Germany ....... 3009489

[51] Int. Cl.$^3$ ........................................... C07C 125/073
[52] U.S. Cl. ................................. 560/25; 260/465 D; 544/37; 560/9; 560/12; 560/13; 560/24; 560/27; 560/28; 560/30; 560/31; 560/32; 560/33; 560/115; 560/132; 560/133; 560/134; 560/136; 560/135; 560/157; 560/158
[58] Field of Search ................... 560/24, 27, 28, 9, 25, 560/30, 12, 13, 115, 157, 158, 31, 32, 33, 132, 133, 134, 135, 136; 260/465 D; 544/37

[56] References Cited

U.S. PATENT DOCUMENTS

| | | | |
|---|---|---|---|
| 3,531,512 | 9/1970 | Hardy et al. | 260/471 |
| 3,956,360 | 5/1976 | Zajacek et al. | 260/471 |
| 4,080,365 | 3/1978 | Hirai et al. | 560/25 |
| 4,170,708 | 10/1979 | Hirai et al. | 560/24 |
| 4,186,269 | 1/1980 | Hirai et al. | 560/25 |
| 4,219,661 | 8/1980 | Becker et al. | 560/24 |
| 4,262,130 | 4/1981 | Becker et al. | 560/24 |

FOREIGN PATENT DOCUMENTS

1458595 12/1976 United Kingdom .

Primary Examiner—G. T. Breitenstein
Attorney, Agent, or Firm—Gene Harsh; Joseph C. Gil; Lyndanne M. Whalen

[57] ABSTRACT

A urethane is produced by reacting an organic nitro compound with carbon monoxide and an organic compound containing at least one hydroxyl group in the presence of a catalyst and a co-catalyst. This reaction is conducted in the liquid phase at elevated temperature and pressure. The catalyst employed is an element and/or compound of an element from the group of noble metals of the 8th Secondary Group of the Periodic Table. The co-catalyst used is formed from (1) a component taken from the group consisting of iron oxychloride, a mixture of iron compounds containing iron oxychloride and oxide-chloride combinations and (2) metallic iron or an iron alloy in finely divided or high surface form. The oxides which may be used in the oxide-chloride combinations of co-catalyst component (1) are the oxides and/or oxide hydrates of tetravalent tin, trivalent chromium, hexavalent molybdenum, hexavalent tungsten, pentavalent vanadium, divalent iron and trivalent iron. The chlorides which may be used in this oxide-chloride combination are chlorides of the elements of Groups IIIA, IVA, VA and IB to VIIIB of the Periodic Table and/or hydrochlorides of tertiary amines.

7 Claims, No Drawings

PROCESS FOR THE PRODUCTION OF URETHANES

BACKGROUND OF THE INVENTION

This invention relates to an improved process for the production of urethanes (carbamic acid esters) by reacting organic nitro compounds with carbon monoxide and compounds containing at least one hydroxy group in the presence of a noble metal and/or a noble metal compound of the 8th Secondary Group of the Periodic Table of Elements and a particular co-catalyst specified below.

Industrially, organic isocyanates are generally produced by reacting the corresponding amines with phosgene. For some time, efforts have been made to find an industrially workable process for producing organic isocyanates in which there is no need to use phosgene. In one such synthesis, organic nitro compounds are reacted with carbon monoxide and organic hydroxyl compounds to form the corresponding urethanes. The urethanes are subsequently split into isocyanates and compounds containing hydroxyl groups. In this process the urethane intermediate may be modified before it is split. Thus, it is possible, for example, to react the phenyl urethane obtainable from nitrobenzene, carbon monoxide and ethanol with formaldehyde to form the bis-urethane of 4,4'-diisocyanatodiphenyl methane and subsequently to convert the thus-obtained intermediate into 4,4'-diisocyanatodiphenyl methane with elimination of the ethanol.

The splitting of urethanes into the corresponding isocyanates and compounds containing hydroxyl groups is described in German Offenlegungsschrift No. 2,421,503 and in the publications discussed therein.

The patent literature describes primarily two types of catalyst for the production of urethanes. For example, German Offenlegungsschrift Nos. 2,343,826; 2,614,101 and 2,623,694 describe the reaction of organic nitro compounds with carbon monoxide and alcohols to form urethanes in the presence of selenium or selenium compounds. Good yields of urethane are obtained by this process with both mononitro and dinitro compounds. However, the selenium compounds (particularly the organoselenium compounds formed as intermediates during the reaction and hydrogen selenide) are extremely toxic and have to be quantitatively removed during the process. This removal may be accomplished by chemical reaction. Such additional treatment increases the expense of the process.

Noble metals (particularly palladium) in the presence of Lewis acids are described as suitable catalysts in German Offenlegungsshcrift Nos. 1,568,044 and 2,603,574. Anhydrous iron (III) chloride is mentioned therein as a particularly effective Lewis acid. Although good yields of urethane, based on the nitro compound present, are obtained using these catalysts, the yields are unsatisfactory when based on the hydroxy compound used. For example, when ethanol is used as the hydroxy component, large amounts of diethyl ether are obtained due to the presence of the Lewis acid. Corrosion of the fine steel autoclaves used as reaction vessels is a significant disadvantage to use of these noble metal/Lewis acid catalysts. Although the degree of corrosion may be reduced to a certain extent by the addition of organic bases, such as pyridine (German Offenlegungsschrift No. 2,603,574), this reduction is not sufficient to permit long term operation. Another disadvantage of these catalyst systems is difficulty in recycling due to the instability of the Lewis acids in the presence of the hydroxy compounds used. Some of these disadvantages are minimized by the processes described in U.S. Pat. No. 4,219,661 and U.S. Pat. No. 4,262,130. However, these processes, in which iron oxychloride and iron oxides and/or iron oxide hydrates in combination with compounds containing chlorides are used as co-catalyst, are attended by the disadvantage that the practical need for high reaction velocities and minimal corrosion still cannot be fully satisfied by the catalysts systems described therein.

SUMMARY OF THE INVENTION

It is an object of the present invention to provide a process for the production of urethanes in which corrosion of the reaction vessel is substantially eliminated.

It is a further object of this invention to provide a high velocity process for the production of urethanes which is highly selective.

These and other objects which will be apparent to those skilled in the art are accomplished by reacting an organic nitro compound with an organic hydroxy compound and carbon monoxide in the presence of elements and/or compounds of elements of Group VIIIB of the Periodic Table and a co-catalyst. The co-catalyst is formed by (a) iron oxychloride; iron mixtures containing iron oxychlorides; oxides and/or oxide hydrates of tetravalent tin, trivalent chromium, hexavalent molybdenum, hexavalent tungsten, pentavalent vanadium, iron (II) or iron (III); chlorides of Groups IIIA, IVA, VA and IB-VIIIB of the Periodic Table; and/or hydrochlorides of tertiary amines and (b) metallic iron in finely divided form.

DETAILED DESCRIPTION OF THE INVENTION

The present invention relates to a process for the production of urethanes by reacting organic nitro compounds with carbon monoxide and organic compounds containing at least one hydroxy group in the liquid phase at elevated temperature and elevated pressure in the presence of elements and/or compounds of elements from the group of noble metals of the 8th Secondary Group of the Periodic Table and a co-catalyst. The co-catalyst used comprises (a) iron oxychloride or a mixture of iron compounds containing iron oxychloride; and/or a combination of (i) oxides and/or oxide hydrates of tetravalent tin, trivalent chromium, hexavalent molybdenum, hexavalent tungsten, pentavalent vandium and/or divalent and/or trivalent iron with (ii) chlorides of the elements of the 3rd to 5th Main Groups or 1st to 8th Secondary Groups of the Periodic Table of Elements and/or hydrochlorides of tertiary amines; and (b) metallic iron or its alloys in finely divided or high surface form.

The iron oxychloride or mixtures containing iron oxychloride co-catalyst component may be produced in a variety of ways. For example, iron oxychloride may be obtained by treating iron (III) oxide with anhydrous hydrogen chloride at temperatures of from 230° to 290° C. (Z. anorgan. Chemie, Vol. 260, 292 (1949)). The reaction which takes place proceeds according to the equation:

$$Fe_2O_3 + 2HCl \rightarrow 2FeOCl + H_2O$$

Iron oxychloride may also be produced by using compounds which give off hydrogen chloride (e.g., salts of tertiary amines such as pyridinium chloride).

Another method for preparing iron oxychloride (described in Bull. Soc. Franc. Mineral. 58,6 (1935)) comprises reacting iron (III) oxide with iron (III) chloride at elevated temperature. This reaction is represented by the equation:

$$Fe_2O_3 + FeCl_3 \rightarrow 3FeOCl$$

Iron oxychloride may also be obtained by hydrolyzing iron (III) chloride in the gas phase (see, e.g., Gmelins Kdbk. 8th Edition, Iron, Part B, 318-319) or in the liquid phase on heating to from 270° to 330° C. in a bomb tube (see, e.g., N. Jahrb. Min. Beilagebd. 52, 334 (1925)). This hydrolysis is believed to proceed in accordance with the equation:

$$FeCl_3 + H_2O \rightarrow FeOCl + 2HCl$$

One particularly advantageous method for producing iron oxychloride is to subject iron chloride hydrates to thermal decomposition at atmospheric pressure and temperatures of from 150° to 300° C. (see, e.g., Z. anorgan. Chemie, Vol. 260, 286 (1949)). This decomposition proceeds in accordance with the equation:

$$FeCl_3 \cdot xH_2O \rightarrow FeOCl + 2HCl + (x-1)H_2O$$

Depending upon the temperature at which the iron oxychloride is produced, the product may contain small to relatively large quantities of decomposition products. Such decomposition products would be expected to reduce the activity of the iron oxychloride in the synthesis of urethanes, particularly where the catalyst system is repeatedly recycled. However, in the process of the present invention, the iron oxychloride does not have to be used in chemically pure form. It is possible to use mixtures of iron oxychloride with other unidentified iron compounds (particularly iron oxides) which accumulate in the production of iron oxychloride on an industrial scale. These other iron compounds are substantially catalytically inert and do not interfere with the process of the present invention. These mixtures should, however, contain at least 10% by weight, and preferably at least 50% by weight of iron oxychloride.

It is preferred that a combination of oxides and/or oxide hydrates of (i) tetravalent tin, trivalent chromium, hexavalent molybdenum, hexavalent tungsten, pentavalent vanadium, divalent iron and/or trivalent iron with (ii) chlorides of the elements of the 3rd to 5th Main Groups or the 1st to 8th Secondary Groups of the Periodic Table be used as the co-catalyst. The reaction accelerating effect of the finely divided iron (component (b)) is particularly noticeable where these combinations are used. Iron oxychloride may, of course, also be included with such combinations.

Suitable oxide co-catalyst components include oxides or oxide hydrates of tetravalent tin, such as $SnO_2$ or $SnO_2 \cdot xH_2O$ (with varying water contents); oxides or oxide hydrates of trivalent chromium, such as $Cr_2O_3$, $Cr_2O_3 \cdot xH_2O$ (with varying water contents), $CrO(OH)$; oxides or oxide hydrates of hexavalent molybdenum, such as $MoO_3$, $MoO_3 \cdot xH_2O$ (x=1,2); oxides or oxide hydrates of hexavalent tungsten, such as $WO_3$, $WO_3 \cdot xH_2O$ (x=1,2); oxides or oxide hydrates or pentavalent vanadium, such as $V_2O_5$, $V_2O_5$-$H_2O$-absorbates; and/or oxides or oxide hydrates of divalent and trivalent iron in pure form or in admixture, such as iron (II) oxide, iron (II) hydroxide, iron (III) hydroxide, $\alpha$-$Fe_2O_3$, $\gamma$-$Fe_2O_3$, $Fe_3O_4$, $\alpha$-FeO-OH, $\beta$-FeO-OH and $\gamma$-FeO-OH. It is preferred to use the oxides and oxide hydrates of trivalent chromium and particularly preferred to use the oxides and oxide hydrates of trivalent iron.

The oxide co-catalyst components must be used in combination with compounds containing chlorine anionically-bound as chloride of elements of the 3rd to 5th Main Groups or of the 1st to 8th Secondary Groups of the Periodic Table of Elements which are not the same as the compounds of the noble metals of the 8th Secondary Group used as the main catalyst component. These chlorides may be present in the form of complex salts, and/or hydrochlorides of tertiary organic amines.

Examples of suitable chlorides are: $AlCl_3$, $SnCl_2 \cdot 2H_2O$, $SbCl_3$, $CuCl_2$, $ZnCl_2$, $CeCl_3$, $TiOCl_2$, $VCl_3$, $CrCl_3$, $FeCl_2 \cdot nH_2O$ (n=0,1,2,4,6), $\alpha$- and $\beta$-$Fe_2(OH)_3Cl$, $FeCl_2 \cdot n$ pyridine (n=$\frac{2}{3}$, 1,2,4), $FeCl_2 \cdot n$ picoline (n=1,4) and similar complex compounds.

Suitable hydrochlorides of tertiary amines are those which are inert under the reaction conditions and which have a molecular weight of from 59 to 10,000, preferably from 59 to 300. Both hydrochlorides of aliphatic tertiary amines and hydrochlorides of cycloaliphatic, aromatic, araliphatic or heterocyclic tertiary amines may be used. Suitable hydrochlorides of tertiary amines may contain substituents such as halogen, alkenyl, cyano, aldehyde, alkoxy, phenoxy, thioalkoxy, thiophenoxy, carbamyl, carboalkoxy, and/or thiocarbamyl groups. Examples of suitable tertiary amines include trimethylamine, triethylamine, tripropylamine, tributylamine, cycloaliphatic tertiary amine, such as N,N-dimethyl cyclohexylamine, N,N-diethyl cyclohexylamine, 1,4-diazabicyclo(2.2.2)octane, aromatic tertiary amines, such as N,N-dimethyl aniline, N,N-diethyl aniline, and also heteroaromatic tertiary amines, such as pyridine, quinoline, isoquinoline, quinaldine, lepidine, pyrolyzed polyacrylonitrile or polyvinyl pyridine. Preferred co-catalyst components are chloride-containing compounds of divalent iron.

In the process according to the present invention, the co-catalyst iron oxychloride, where it is not replaced by the oxide-chloride combination, may be used in a quantity of from 0.1 to 20%, by weight, preferably from 1 to 5%, by weight, based on the total quantity of the reaction mixture (including any solvent used). In the process according to the present invention, the co-catalyst oxide-chloride combination, unless it is completely replaced by iron oxychloride, may be used in corresponding amounts which means that the oxide component may be used in an amounts of from 0,1 to 20%, by weight, preferably from 1 to 5%, by weight, based on the reaction mixture (including the solvent used, if any). Where an oxide-chloride combination is used as the co-catalyst, the chloride component should be used in concentrations of from 0.05 to 10%, by weight, more particularly from 0.1 to 5%, by weight, based on the reaction mixture, including any solvent used. In general, the chloride component of the co-catalyst combination should be used in such a quantity that, per mole of metal chemically-bound in the oxide component, there is at least 0.001 mole, preferably at least 0.01 mole, and most preferably at least 0.1 mole, of chloride ions bound in the chloride component. Where both iron oxychloride and a chloride-oxide combination are simultaneously used as the co-catalyst, the quantities in which the individual components are employed may be reduced to such an extent that the reaction mixture (including any solvent used) contains a total of from 0.1 to 20%, by weight, preferably from 1 to 5%, by weight, iron oxychloride and oxide components of the oxide-chloride combination.

The iron co-catalyst component essential to the present invention may be alloyed (for example, steel) or non-alloyed. The metallic iron which is used must be in finely divided form, i.e., high surface form, such as powder, filings or sponge. It is preferred to use iron powder having a mean particle size of from 0.001 to 0.1 mm. This iron co-catalyst should be used in a quantity of from 0.05 to 10%, by weight, preferably from 0.1 to 2% by weight, based on the reaction mixture including any solvent used. However, since no significant difficulties are involved in recovering the iron co-catalyst component, it is possible to use larger quantities of this component.

The preferred co-catalyst systems according to the present invention consist of iron powder, iron oxides and iron (II) chloride compounds of the type exemplified above.

The main catalyst component is a noble metal selected from the group of noble metals belonging to the 8th Secondary Group of the Periodic Table of Elements (ruthenium, rhodium, palladium, osmium, iridium, platinum), as well as salts and complexes of these elements of the type exemplified below. The use of these salts and complexes is preferred to the use of the elemental metals. It is particularly preferred to use those salts or complexes of the above-mentioned noble metals which are soluble in the reaction mixture. It is also possible to use an inert support, for example, an aluminum oxide support, for the metals or metal compounds. Suitable salts and complex compounds of the noble metals are the chlorides, bromides, iodides, sodium tetrachloro-, potassium tetrachloro-, sodium tetrabromo-, sodium tetraiodo-, potassium tetraiodo- complexes, acetates or acetyl acetonates thereof. It is particularly preferred to use palladium chloride.

The above-mentioned noble metals and noble metal compounds are preferably used in a quantity of from 0.0001 to 0.1%, by weight, more particularly from 0.0002 to 0.01%, by weight, expressed as elemental metal and based on the reaction mixture, including any solvent used. When lower concentrations are used, the reaction velocity is drastically reduced. Although higher concentrations may be used, such amounts are uneconomical due to the potential loss of noble metal, without a corresponding increase in the yields of urethane. It is one of the main advantages of the process according to the present invention that it enables urethanes to be produced in excellent yields with only extremely small quantities of noble metal catalyst.

In one particular embodiment of the process according to the present invention, a base, preferably a tertiary amine, may be used as a further catalyst component. The use of tertiary amines increases the selectivity of the urethanation reaction with regard to possible undesirable secondary reactions involving the organic hydroxy compounds used as a reactant.

Suitable organic bases are, in particular, tertiary amines which are inert under the reaction conditions and which have a molecular weight from 59 to 10,000, preferably from 59 to 300. Both aliphatic and cycloaliphatic, aromatic, araliphatic or heterocyclic tertiary amines are suitable. It is also possible to use tertiary amines which contain substituents such as halogen, alkenyl, cyano, aldehyde, alkoxy, phenoxy, thioalkoxy, thiophenoxy, carbamyl, carboalkoxy and/or thiocarbamyl groups. Examples of suitable tertiary amines are trimethylamine, triethylamine, tripropylamine, tributylamine and the like, cycloaliphatic tertiary amines, such as N,N-dimethyl cyclohexylamine, N,N-diethyl cyclohexylamine, 1,4-diazabicyclo-(2,2,2)-octane and the like; aromatic tertiary amines, such as N,N-dimethyl aniline, N,N-diethylaniline, also heteroaromatic tertiary amines, such as pyridine, quinoline, isoquinoline, quinaldine, lepidine, pyrolyzed polyacrylonitrile or polyvinyl pyridine.

The tertiary amines may be used in concentrations of from 0.01 to 10%, by weight, more particularly from 0.1 to 5%, by weight, based on the reaction mixture including any solvent used.

Starting compounds for the process according to the present invention are organic nitro compounds and organic compounds containing at least one hydroxy group. Suitable organic nitro compounds are those which are otherwise inert under the conditions of the process according to the present invention. These organic nitro compounds contain at least one aliphatically-, cycloaliphatically- and/or aromatically-bound nitro group and generally have a molecular weight of from 61 to 400, preferably from 123 to 262. Suitable hydroxy organic compounds include substituted and unsubstituted, aliphatic, cycloaliphatic, and/or aromatic monohydroxy or polyhydroxy compounds generally having a molecular weight of from 32 to 228, preferably from 32 to 102.

The following aromatic nitro compounds, for example, may be used: nitrobenzene, o-dinitrobenzene, m-dinitrobenzene, p-dinitrobenzene, o-chloronitrobenzene, m-chloronitrobenzene, o-chloronitrobenzene, o-nitrotoluene, m-nitrotoluene, p-nitrotoluene, 2,3-dinitrotoluene, 2,4-dinitrotoluene, 2,5-dinitrotoluene, 2,6-dinitrotoluene, 3,4-dinitrotoluene, 3-nitro-o-xylene, 4-nitro-o-xylene, 2-nitro-m-xylene, 4-nitro-m-xylene, 5-nitro-p-xylene, 3,4-dinitro-o-xylene, 3,5-dinitro-o-xylene, 3,6-dinitro-o-xylene, 4,5-dinitro-o-xylene, 2,4-dinitro-m-xylene, 2,5-dinitro-m-xylene, 4,5-dinitro-m-xylene, 4,6-dinitro-m-xylene, 2,3-dinitro-p-xylene, 2,6-dinitro-p-xylene, 1-nitronaphthalene, 2-nitronaphthalene, dinitronaphthalenes, nitroanthracenes, nitrodiphenyls, bis-(nitrophenyl)-methanes, bis-(nitrophenyl)-thioethers, bis-(nitrophenyl)-sulphones, nitrodiphenoxy alkanes and nitrophenothiazines.

Suitable cycloaliphatic nitro compounds are nitrocyclobutane, nitrocyclopentane, nitrocyclohexane, 1,2-dinitrocyclohexane, 1,3-dinitrocyclohexane, 1,4-dinitrocyclohexane and bis-(nitrocyclohexyl)-methanes.

Examples of nitroalkanes are nitromethane, nitroethane, 1-nitropropane, 2-nitropropane, nitrobutanes, nitropentanes, nitrohexanes, nitrodecanes, nitroketanes, 1,2-dinitroethane, 1,2-dinitropropane, 1,3-dinitropropane, dinitrobutanes, dinitropentanes, dinitrohexanes, dinitrodecanes, phenylnitromethane, bis-(nitromethyl)-cyclohexanes, bis-(nitromethyl)-benzenes and ω-nitrocarboxylic acid nitriles.

Particularly preferred nitro compounds for the process according to the present invention are aromatic nitro compounds such as nitrobenzene, 1,3-dinitrobenzene, 2,4-dinitrotoluene, 2,6-dinitrotoluene, dinitronaphthalenes such as 1,5-dinitronaphthalene, and 2,4'- and 4,4'-dinitrodiphenyl methane.

The organic compounds containing hydroxy groups which are suitable for use in the present invention include monohydric alcohols, polyhydric alcohols, monohydric phenols and polyhydric phenols.

Appropriate alcohols include monohydric and polyhydric linear or branched alkanols, cycloalkanols, alkenols, cycloalkenols, aralkyl alcohols and the like. These alcohols may contain a substituent containing oxygen, nitrogen, sulfur or a halogen atom. Such substituent groups include sulphoxide, sulphone, amine, amide, carbonyl and carboxylic acid ester groups. The following monohydric alcohols may be used in the practice of the present invention: methyl alcohol, ethyl alcohol, propanol, isopropanol, butanol, pentanol, hexanol, cyclohexanol and benzyl alcohol. Suitable polyhydric alcohols are, for example, ethylene glycol, diethylene glycol, propylene glycol, dipropylene glycol, glycerol, hexane triol and higher polyols. It is preferred to use monohydric aliphatic alcohols containing from 1 to 6 carbon atoms with ethyl alcohol being particularly preferred.

Phenols suitable for use in accordance with the present invention include: phenol, chlorophenols, cresols, ethyl phenols, propyl phenols, butyl phenols or higher alkyl phenols, pyrocatechol, resorcinol, 4,4'-dihydroxy diphenyl methane, bisphenol-A, anthranol, phenanthrol, pyrogallol or phloroglucinol.

In the practical application of the process according to the present invention, when mononitro compounds are used as starting material, the organic hydroxy compounds are generally used in such quantities that there is an equivalent ratio of nitro groups to hydroxyl groups of from 1:0.5 to 1:100, preferably from 1:1 to 1:100. Where dinitro compounds are used, the equivalent ratio of nitro groups to hydroxyl groups should be from 1:1 to 1:100. It is particularly preferred to use the preferred alcohols in excess with the unreacted excess serving as reaction medium.

The carbon monoxide may be used in a quantity corresponding to from 1 to 30 moles of carbon monoxide per mole of nitro groups to be reacted. The carbon monoxide is generally introduced under pressure into the reactor.

The reaction according to the present invention may be carried out in the presence or absence of a solvent. In general, it is preferred that an excess of the organic hydroxyl compound be used as solvent. However, it is also possible to use inert solvents which make up as much as 80%, by weight, of the reaction mixture as a whole. Regardless of whether the solvent is an excess of the hydroxyl compound or an inert solvent, the quantity used must be such that the heat of reaction of the exothermic urethane-forming reaction may be dissipated without a deleterious increase in temperature. Therefore, the process according to the present invention is generally carried out using a concentration of nitro compounds of from 5 to 40%, by weight, and preferably from 5 to 30%, by weight, based on the entire reaction mixture including the solvent.

Suitable solvents are solvents which are inert to the reaction components and to the catalyst system. Such solvents include aromatic, cycloaliphatic and aliphatic hydrocarbons which may optionally be substituted by halogen, such as benzene, toluene, xylene, chlorobenzene, dichlorobenzene, trichlorobenzene, chloronaphthalene, cyclohexane, methyl cyclohexane, chlorocyclohexane, methylene chloride, carbon tetrachloride, tetrachloroethane, trichlorotrifluoroethane and similar compounds.

The reaction temperature is generally from 100° to about 300° C., preferably from 150° to 250° C. and most preferably from 170° to 200° C. The pressure under which the reaction is carried out should be measured in such a way that the presence of a liquid phase is always guaranteed and is generally from 5 to 500 bars with pressures from 50 to 300 bars at the reaction temperature being preferred. Depending upon the nitro compound and hydroxy compound used, the reaction time required to obtain a quantitative conversion may range from a few minutes to several hours.

The reaction of the nitro compounds with the hydroxy compounds and carbon monoxide to form urethanes may be carried out either continuously or in batches.

The batchwise reaction may be carried out in a high-pressure autoclave. The non-dissolved catalyst and co-catalyst may be dispersed by vigorous stirring or by pump-circulation of the reaction mixture. The heat of the exothermic reaction may be dissipated directly by partial evaporation by means such as a boiling reactor or indirectly by heat exchange through internally installed cooling units or through an external heat exchanger. Working-up and recycling of the catalyst may be accomplished in a variety of ways, depending upon the solubility of the urethane produced in the reaction mixture. For example, most of a co-catalyst mixture which is sparingly soluble at low temperatures, together with most of the adsorbed noble metal compound and any organic amine salt used may be separated from a readily soluble urethane by filtration or centrifuging upon completion of the reaction. These recovered materials may then be reused.

The liquid reaction mixture may be separated into the pure urethanes and, optionally, small quantities of secondary products by methods known to those in the art. Such methods include fractional distillation and/or crystallization in solvents. Such separation may be carried out either continuously or in batches. In many cases, the distillation residue still contains small quantities of the co-catalyst component dissolved in the reaction mixture and/or traces of the noble metal catalyst which may be returned to the reaction.

In the case of urethanes which are substantially insoluble in the solvent or excess hydroxy compound, it may be advantageous to work up the reaction mixture by different methods. For example, after venting under pressure and elevated temperature, while the urethanes are still dissolved and the catalyst/co-catalyst mixture is largely a precipitate, most of the catalyst may be filtered off or centrifuged off. After removing the catalyst/co-catalyst mixture, the substantially insoluble urethane may be crystallized out of solution by reducing the temperature. Small quantities of substantially insoluble secondary products and residual catalyst will also precipitate out. The remaining mother liquor contains solvent or the excess organic hydroxy compound used as a solvent, small quantities of secondary products, dissolved urethane and possibly dissolved co-catalyst components. This mother liquor may be returned to the urethanation reaction vessel either directly or after removal of low-boiling secondary products (for example, by distillation). The quantity of nitro compound and hydroxy compound present in the reaction vessel to which the mother liquor is charged should correspond to that of the previous conversion. Relatively high boiling secondary products which are not removed by crystallization may be continuously removed from the return stream as distillation residue by working up a portion of the mother liquor by distillation.

The thus-separated crude urethane may be recrystallized, for example, by crystallization in a solvent which dissolves the urethane at elevated temperatures, but which does not dissolve the secondary products and the catalyst residues. Such solvents include iso-octane, benzene, toluene, xylene, chlorobenzene and dichlorobenzene. The residues which are insoluble at elevated temperature may then be converted by oxidation (for example, exposure to atmospheric oxygen) into a mixture containing metal oxides corresponding to the catalysts and co-catalysts used and a waste gas. This waste gas may contain carbon dioxide, oxygen, nitrogen and/or volatile organic impurities. Depending upon its composition, the waste gas may be either directly vented to the atmosphere or delivered to a catalytic post-combustion stage in which residual impurities are removed by oxidation. The metal oxide/metal mixture obtained from these residues, which may still contain small quantities of the noble metal of the 8th Secondary Group, may be returned to the reaction vessel.

A continuous urethanation reaction may be carried out in reaction vessels in series, in a nested-tube reactor, in several loop reactors arranged one behind the other or in an adiabatic reaction tube or a series of adiabatic reaction tubes arranged one behind the other. The heat generated during the reaction may be dissipated either internally by installed cooling units, externally through a nested-tube heat exchanger or adiabatically through the thermal capacity of the reaction mixture, followed by cooling in external cooling units.

Further working up of the product of such a continuous process may be carried out as described above (with respect to batch operations) either continuously or in batches.

Where the products according to the present invention are used as intermediates for producing the corresponding isocyanates, purification of the urethane is often unnecessary. It may be possible to introduce the crude products (after filtration of the catalyst and, optionally, removal of the solvent by distillation) into the isocyanate-conversion processing cycle.

The process according to the present invention is illustrated by the following Examples. These Examples should not however, be construed as limiting the scope of the invention. All percentages given in these Examples are percents by weight unless otherwise indicated.

EXAMPLES

In each of these Examples, the iron powder used had a mean particle size of 0.005 mm. Examples 1 to 5 demonstrate the high selectivity and the high reaction velocity of the urethane-forming reaction obtained with the co-catalyst of the present invention. Examples 6 and 7 illustrate the corrosion inhibiting effect of the co-catalyst of the present invention.

EXAMPLE 1

A solution of 50 g of nitrobenzene in 200 g of ethanol, together with 0.005 g of palladium chloride (19 ppm), 10.0 g of $\alpha$-$Fe_2O_3$ (3.8% by weight), 3.0 g of $FeCl_2.4H_2O$ (1.1% by weight), 1.0 g of iron powder (0.4% by weight) and 2.5 g of pyridine (0.9% by weight) was introduced into a 0.7 liter stainless steel autoclave. Carbon monoxide was then introduced under pressure at room temperature up to a pressure of 120 bars. The contents of the autoclave were heated to 180° C. The pressure in the reactor reached a maximum of 145 bars. The contents of the reactor were maintained at that temperature and at a pressure of 100 bars for two hours. After the reaction mixture was cooled to room temperature, the reaction gas was vented through a cold trap. The liquid contents of the autoclave and the liquid deposited in the cold trap were analyzed by gas chromatography. The nitrobenzene conversion was determined to be 100%. The selectivity with regard to phenyl urethane (O-ethyl-N-phenyl carbamic acid ester), based on nitrobenzene was also 100%. The effective reaction time (up to constant pressure) was only 20 minutes. (Without the addition of iron, the reaction took 90 minutes).

EXAMPLE 2

The procedure was the same as that used in Example 1, with the exception that 7.3% by weight of $\alpha$-$Fe_2O_3$, 0.7% by weight of iron powder and 0.4% by weight of pyridinium chloride were used in the catalyst/co-catalyst mixture. Pyridine itself was not added. The nitrobenzene conversion was determined to be 100%. The selectivity with regard to the phenyl urethane, based on nitrobenzene was determined to be 98%. The effective reaction time (up to constant pressure) was only 60 minutes. (Without the addition of iron, a reaction time of 2 hours was not sufficient to obtain a complete conversion).

EXAMPLE 3

The procedure used was the same as that used in Example 1, with the exception that 6.8% by weight (based on the total mixture) of 2,4-dinitrotoluene (DNT) was used instead of nitrobenzene. The co-catalyst employed was 5.6 wt. % $\alpha$-$Fe_2O_3$, 1.1 wt. % $FeCl_2.4H_2O$, 0.8 wt. % iron powder and 0.9 wt. % pyridine. The DNT conversion amounted to 100%. The selectivity with regard to bis-urethane was 90%, based on DNT. The effective reaction time was only 20 minutes.

EXAMPLE 4

In a pyridine-free reaction carried out under the same conditions as in Example 1 with the exception that 3.8 wt. % $Cr_2O_3$, 1.1 wt. % $FeCl_2.2H_2O$, and 0.75 wt. % iron powder were used instead of the co-catalyst combination of $\alpha$-$Fe_2O_3$/$FeCl_2.4H_2O$/Fe. A complete nitrobenzene conversion and 95% phenyl urethane selectivities, based on both nitrobenzene and the ethanol used were obtained after a reaction time of only about 30 minutes at 180° C. Without the addition of iron powder, only 80% of the nitrobezene used had been converted after a reaction time of 2 hours at 180° C., the phenyl urethane selectivity, based on the ethanol reacted, amounted to only 83%. Based on the nitrobenzene conversion, the phenyl urethane selectivity amounted to 97%.

EXAMPLE 5

A series of tests in which the concentrations of the starting materials and the reaction conditions correspond to those of Example 4, the metal oxide component of the co-catalyst was varied. $SnO_2$, $MoO_3$ and $WO_3$ were each used in one of these tests in quantities of 3.8% by weight. As can be seen from the results presented in the table below, in every case, distinct increases in conversion were obtained by the addition of 0.75% by weight of iron powder to the co-catalyst.

| Metal Oxide | Nitrobenzene conversion [%] without Fe powder | Nitrobenzene conversion [%] with Fe powder | Phenyl urethane selectivity based on the conversion of nitrobenzene | |
|---|---|---|---|---|
| | | | without Fe | with Fe |
| $SnO_2$ | 30 | 100 | 98 | 98 |
| $MoO_3$ | 30 | 40 | 80 | 90 |
| $WO_3$ | 20 | 30 | 86 | 80 |

EXAMPLE 6

Phenyl urethane was synthesized over a period of 312 hr at 220° C. using the same reactants and catalysts in the same concentrations as in Example 1. Metal samples of certain steels and Hastelloy were added to the reaction mixture to determine their susceptibility to corrosion when the co-catalyst mixture of the present invention was used in producing urethane.

It was found that, with certain steels (Numbers 4439, 4465, Awesta-254-SMO) and with Hastelloy C 4, there was no significant corrosion, i.e., degree of corrosion was determined to be $\leq 0.02$ mm/year. These same materials showed no signs of pitting.

A corresponding test in which no iron powder was used produced noticeable corrosion (i.e., $\geq 0.1$ mm/year) and pitting in the steel samples used.

EXAMPLE 7

A corrosion test was carried out under the same conditions used in Example 5 with the exception that 2,4-dinitrotoluene was used and the reaction temperature was 180° C. It was found that the addition of iron powder to the reaction mixture substantially prevented corrosion (degree of corrosion: $\leq 0.02$ mm/year) and also suppressed pitting both in the case of steels (4439, 4571, 5439) and also in the case of Hastelloy C 4.

What is claimed is:

1. A process for the production of a urethane in which an organic nitro compound is reacted with carbon monoxide and an organic compound containing at least one hydroxyl group in the liquid phase at elevated temperature and pressure in the presence of (a) a catalyst taken from the group consisting of the elements and compounds of elements from the group of noble metals of the 8th Secondary Group of the Periodic Table and (b) a co-catalyst, characterized in that the co-catalyst used comprises:
   (1) a component taken from the group consisting of
      (A) iron oxychloride
      (B) a mixture of iron compounds containing iron oxychloride, and
      (C) combinations of
         (i) oxides and/or oxide hydrates of tetravalent tin, trivalent chromium, hexavalent molybdenum, hexavalent tungsten, pentavalent vanadium, divalent iron and/or trivalent iron with
         (ii) a chloride of one of the elements of the 3rd to 5th Main Groups or 1st to 8th Secondary Groups of the Periodic Table of Elements and/or hydrochlorides of tertiary amines; and
   (2) metallic iron or an iron alloy in finely divided or high surface form.
2. The process of claim 1, wherein a combination of (i) trivalent iron oxide and/or trivalent iron oxide hydrates with (ii) iron (II) chloride, iron (II) chloride hydrates and/or iron (II) chloride complexes is used as the co-catalyst component (1).
3. The process of claim 1, wherein a free tertiary amine is used as an additional catalyst component.
4. The process of claim 1, wherein nitrobenzene or dinitrotoluene is used as the organic nitro compound.
5. The process of claim 1 wherein a monohydric aliphatic alcohol containing from 1 to 6 carbon atoms is used as the organic compound containing at least one hydroxyl group.
6. The process of claim 1, wherein the reaction is carried out at a temperature of from 100° to 250° C.
7. The process of claim 1, wherein the reaction is carried out at a pressure of from 5 to 500 bars.

* * * * *